Sept. 15, 1959 J. WASYLUK 2,904,237
BASKET CARRIER FOR WHEELED STROLLERS
Filed Feb. 1, 1957 2 Sheets-Sheet 1
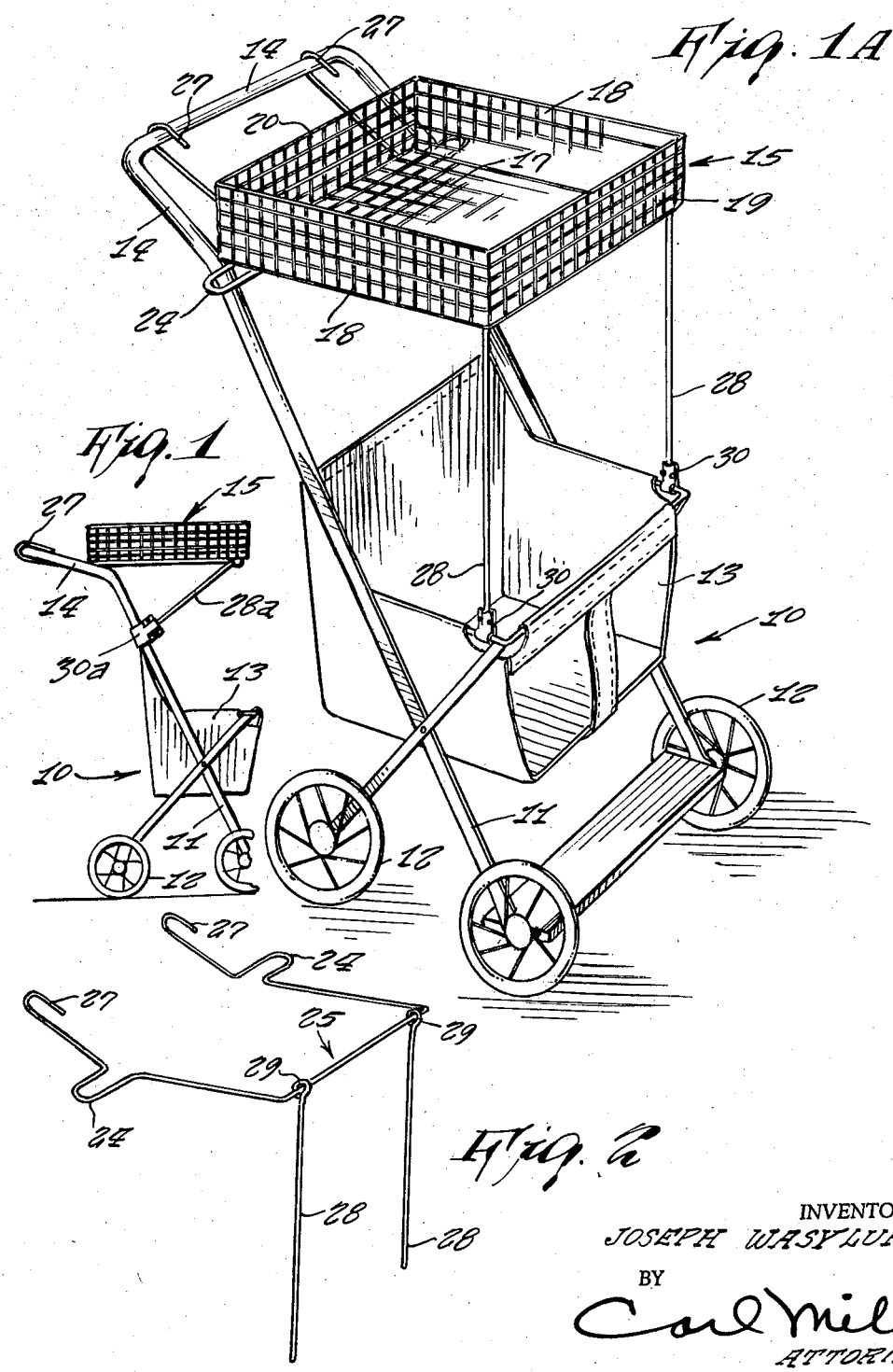
INVENTOR.
JOSEPH WASYLUK
BY
Carl Miller
ATTORNEY Sept. 15, 1959    J. WASYLUK    2,904,237
BASKET CARRIER FOR WHEELED STROLLERS
Filed Feb. 1, 1957    2 Sheets-Sheet 2
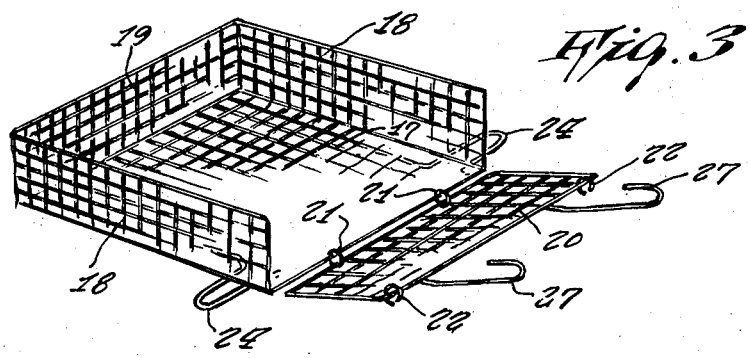
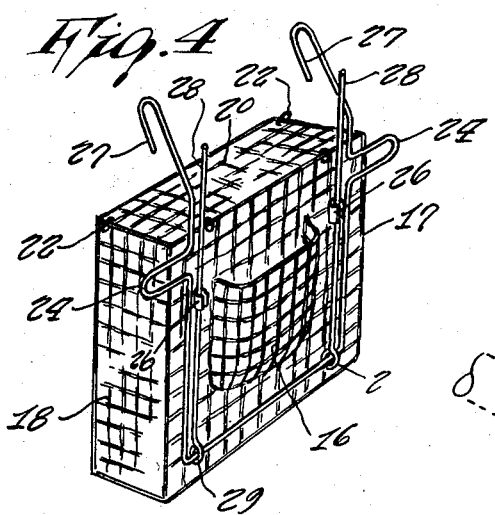
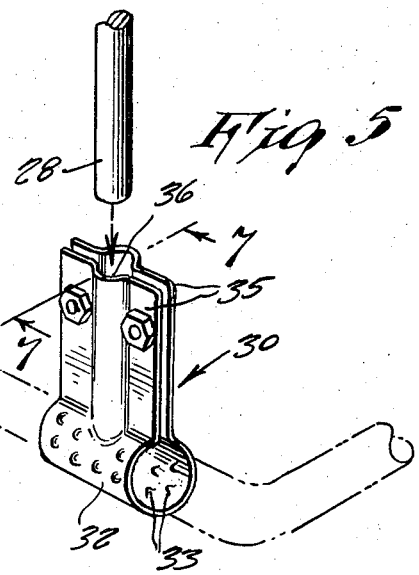
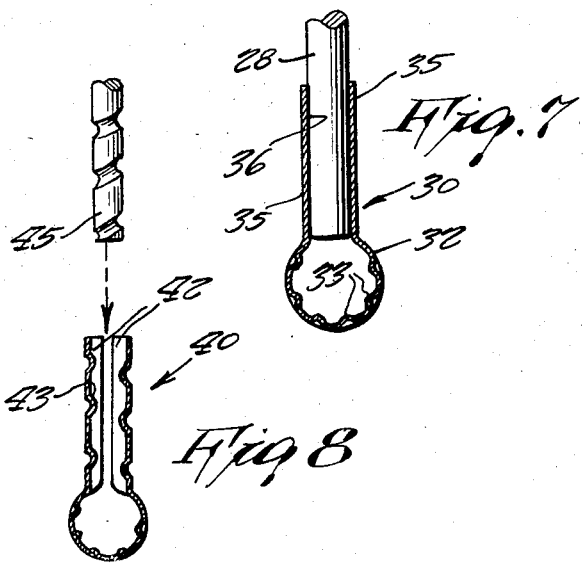
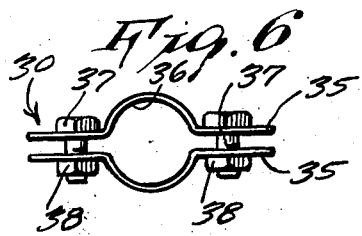
INVENTOR.
JOSEPH WASYLUK
BY
Carl Miller
ATTORNEY

United States Patent Office 2,904,237
Patented Sept. 15, 1959

2,904,237

BASKET CARRIER FOR WHEELED STROLLERS

Joseph Wasyluk, Jersey City, N.J.

Application February 1, 1957, Serial No. 637,837

1 Claim. (Cl. 224—42.45)

This invention relates to carrier devices and more particularly to a basket carrier for wheeled infant strollers.

This invention relates to and is an improvement upon my invention disclosed and claimed in my co-pending application, Serial No. 607,796, filed September 4, 1956, now U.S. Patent No. 2,798,651, dated July 9, 1957, for canopy carrier for strollers. In view of the substantially large purchases ordinarily made during an ordinary shopping trip, it has been found extremely convenient to have a stroller that is provided with sufficient storage space for carrying the packages. Thus, a parent is able to push the infant in the stroller with both hands while the purchased articles are safely stored therein. An object of this invention, therefore, is to provide an infant stroller support bracket for an overhead carrier basket for the storage of purchased articles that is simple in construction, efficient in operation, and which is substantially rigid so as to accommodate a considerable quantity and weight of purchased articles.

Another object of this invention is to provide a bracket for a substantially shallow rectangular basket having a support frame that is adapted to be supported upon the frame of a stroller and which has means for vertically supporting all sides thereof.

A still further object of the present invention is to provide a support bracket for wheeled stroller frames that is adapted to supportingly receive depending legs of an overhead carrier basket that may be readily attached and removed from the stroller without otherwise affecting the construction thereof.

All of the foregoing and still further objects and advantages of this invention will become apparent from a study of the following specification, taken in connection with the accompanying drawing, wherein:

Figure 1 is a side view of a stroller having an overhead carrier basket supported in accordance with one form of the present invention;

Figure 1A is a perspective view of a wheeled infant stroller having an overhead carrier basket supported in accordance with a modified form of the present invention;

Figure 2 is a perspective view of the carrier basket support frame;

Figure 3 is a perspective view of the carrier basket made in accordance with the present invention, in an open position;

Figure 4 is a perspective view, showing the basket in a folded inoperative position;

Figure 5 is an enlarged perspective view of a support clamp made in accordance with the present invention;

Figure 6 is a top plan view of the clamp shown in Figure 5;

Figure 7 is a cross sectional view taken along line 7—7 of Figure 5; and

Figure 8 is a cross sectional view of a modified form of clamp.

Referring now to Figure 1A of the drawing, a stroller 10 made in accordance with the present invention is shown to include a substantially rigid metallic framework 11 that is supported upon rotatable wheels 12, and which is provided with a seat 13 adapted to support an infant. An upwardly and rearwardly extending handle 14 forms a part of the frame 11 and is adapted to provide means for pushing the stroller along a surface.

The carrier basket 15, made in accordance with present invention, is shown to include a bottom 17, substantially rigid vertical sides 18, and front wall 19. As is more clearly shown in Figures 3 and 4, the back wall 20 is hingedly connected to the bottom 17, such as by rings 21. This wall 20 is adapted to be secured in a closed position by similar slip rings 22. When the carrier 15 is swung to an inoperative position 15a, as shown in Figure 4, an upwardly opening pocket 16 secured to the under surface of the bottom wall 17, is operative to support small articles therein. The walls and bottom of the carrier basket are preferably constructed of wire mesh material so as to provide substantial rigidity and shape retaining features under constant use. However, other similar rigid materials may be used as a matter of choice.

A substantially U-shaped support frame 25, as shown in Figure 2, is provided with a pair of rearwardly disposed hooks 27 that are adapted to be rotatably supported upon the handle 14 of the stroller. This frame 25 is secured, such as by spot welding, to the bottom surface of the bottom wall 17. The forward end of the frame 25 is rotatably engaged by the eye portions 29 of downwardly depending vertical legs 28. The laterally outwardly extending side arms 24 of the frame 25 are supported upon the sides of the handle 14, as is clearly shown in Figure 1a.

As is clearly shown in Figure 1A, the lower extremities of the legs 28 are received within clamps 30 that are secured to the seat defining portions of the frame 11. As is more clearly shown in Figure 5, each clamp 30 is of substantially U-shape and has a substantially horizontal lower tubular portion 32 which receives the associated portion of the frame 11. This portion is provided with inwardly extending projections 33 that are adapted to frictionally engage the associated part so as to maintain the clamp in a predetermined vertical position. The upper extremity of the clamp 30 includes a pair of spaced legs 35 that define a central vertical tubular portion 36 for removably receiving the lower ends of the legs 28. A plurality of bolts and nuts 37, 38, provide means for adjusting the tightness of the clamp with respect to the support frame 11 and the depending leg 28.

Referring now to Figure 8 of the drawing, a modified form of clamp 40 is shown wherein the upwardly extending vertical legs 42 define an internally threaded tubular portion 43 that is adapted to threadingly engage a similarly threaded vertical leg 45 so as to maintain these parts in a more stationary and locked relationship.

In Figure 1 of the drawing, a modified arrangement is shown, wherein the depending support legs 28a, define an acute angle with the plane of the basket 15 and are received at their lower ends within the similar clamps 30a that are secured to the inclined portion of the stroller frame 11. This arrangement is particularly suited where the loads to be carried by the basket 15 are of lighter weight and where better visibility for the infant is desired.

In use, the basket is supported in the positions shown in Figures 1 and 1A. By removing the engagement of the depending legs 28, 28a with the associated clamps, the basket may be rotated about the hooks 27 that are supported upon the handle 14, whereby the basket will be disposed behind the seat 13 of the stroller and in the position shown in Figure 4. A pair of brackets 26 secured to the undersurface bottom of the wall 17 are adapted to clampingly receive the mid portion of the legs 28 to maintain them in a retracted position. In this position, the pocket 16 becomes readily accessible for carrying small packages.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A support bracket for securing a shallow basket to the frame of a wheeled stroller comprising, in combination, a substantially U-shaped bail member having a straight central section and a pair of spaced apart parallel sides, one end of each of said sides being integral with said central section, the free end of each one of said sides defining a reentrant hook portion opening forwardly and downwardly and toward said central section for rotatably engaging the base of the handle frame of the wheeled stroller, each one of said sides intermediate said central section and said respective free end defining a substantially U-shaped arm extending laterally outwardly and a pair of rods rotatably carried at one end upon said central section each adjacent to one of said sides of said bail member and having clamp means at the opposite end for supported engagement with the sides of the handle frame of the wheeled stroller, both of said rods depending downwardly from said central section, and said rods being adjustably slidably supported upon said central section for accommodating wheeled stroller frames of different widths.

References Cited in the file of this patent

UNITED STATES PATENTS

| | | |
|---|---|---|
| 595,240 | Lincoln | Dec. 7, 1897 |
| 743,827 | Campbell | Nov. 10, 1903 |
| 1,875,107 | Mueller | Aug. 30, 1932 |
| 2,531,902 | Baron | Nov. 28, 1950 |
| 2,558,372 | Nidermayer | June 26, 1951 |
| 2,798,651 | Wasyluk | July 9, 1957 |

FOREIGN PATENTS

| | | |
|---|---|---|
| 16,888 | Great Britain | 1909 |
| 75,033 | Norway | May 2, 1949 |